United States Patent
Marsan

[19]

[11] Patent Number: 6,144,490
[45] Date of Patent: Nov. 7, 2000

[54] VIDEO DISPLAY SYSTEM HAVING MULTIPLE PANEL SCREEN ASSEMBLY

[76] Inventor: Kathryn A. Marsan, 6 Greenbrier Rd., Trumbull, Conn. 06611

[21] Appl. No.: 09/292,433

[22] Filed: Apr. 15, 1999

[51] Int. Cl.[7] .................................................. G03B 21/56
[52] U.S. Cl. ............................ 359/449; 359/451; 353/30
[58] Field of Search ..................................... 359/443, 446, 359/449, 451, 450; 353/10, 30, 34, 49, 122

[56] References Cited

U.S. PATENT DOCUMENTS

| | | | |
|---|---|---|---|
| 2,381,614 | 8/1945 | Möller et al. ............................. | 88/28.9 |
| 2,511,702 | 6/1950 | Elian ........................................ | 88/28.9 |
| 2,542,789 | 2/1951 | Ames, Jr. .................................. | 88/29 |
| 2,909,963 | 10/1959 | Hehn ....................................... | 88/28.9 |
| 3,126,788 | 3/1964 | Hourdiaux ............................... | 88/28.9 |
| 3,180,215 | 4/1965 | Hourdiaux ............................... | 88/28.9 |
| 3,263,561 | 8/1966 | Jackson .................................... | 88/28.9 |
| 3,514,871 | 6/1970 | Tucker ..................................... | 35/12 |
| 3,682,527 | 8/1972 | Pirelli ...................................... | 350/123 |
| 4,095,882 | 6/1978 | Karamon .................................. | 353/122 |
| 4,167,311 | 9/1979 | Pund ........................................ | 353/99 |
| 4,750,807 | 6/1988 | Chamayou dit Felix ............... | 350/125 |
| 4,962,420 | 10/1990 | Judenich .................................. | 358/60 |
| 5,103,339 | 4/1992 | Broome ................................... | 359/443 |
| 5,137,348 | 8/1992 | Lacroix ................................... | 353/79 |
| 5,708,527 | 1/1998 | Adamson et al. ....................... | 359/451 |
| 5,724,775 | 3/1998 | Zobel, Jr. et al. ....................... | 52/82 |

OTHER PUBLICATIONS

"Point of Purchase Magazine", Feb. 1999.
Photographs of POPVideo Installation at Macy's Herald Square, Mar., 1999.

*Primary Examiner*—Russell Adams
*Assistant Examiner*—Christopher Mahoney
*Attorney, Agent, or Firm*—Harness, Dickey & Pierce, P.L.C.

[57] ABSTRACT

A video display system is provided having a projector source for projecting a video image on a screen assembly including a plurality of screen panels having a concave or convex curvature, arranged at varying angles and distance to one another, such that each panel exists at different, intersecting planes in space. An animated video image displayed on the screen assembly appears to pass over the screen panels, undulating along the curved surfaces such that a viewer is provided with the sense that parts of the projected image move independently within the whole at various speeds, depending on the curvature of the screen panels and the relative position of the viewer to the video display system.

29 Claims, 4 Drawing Sheets

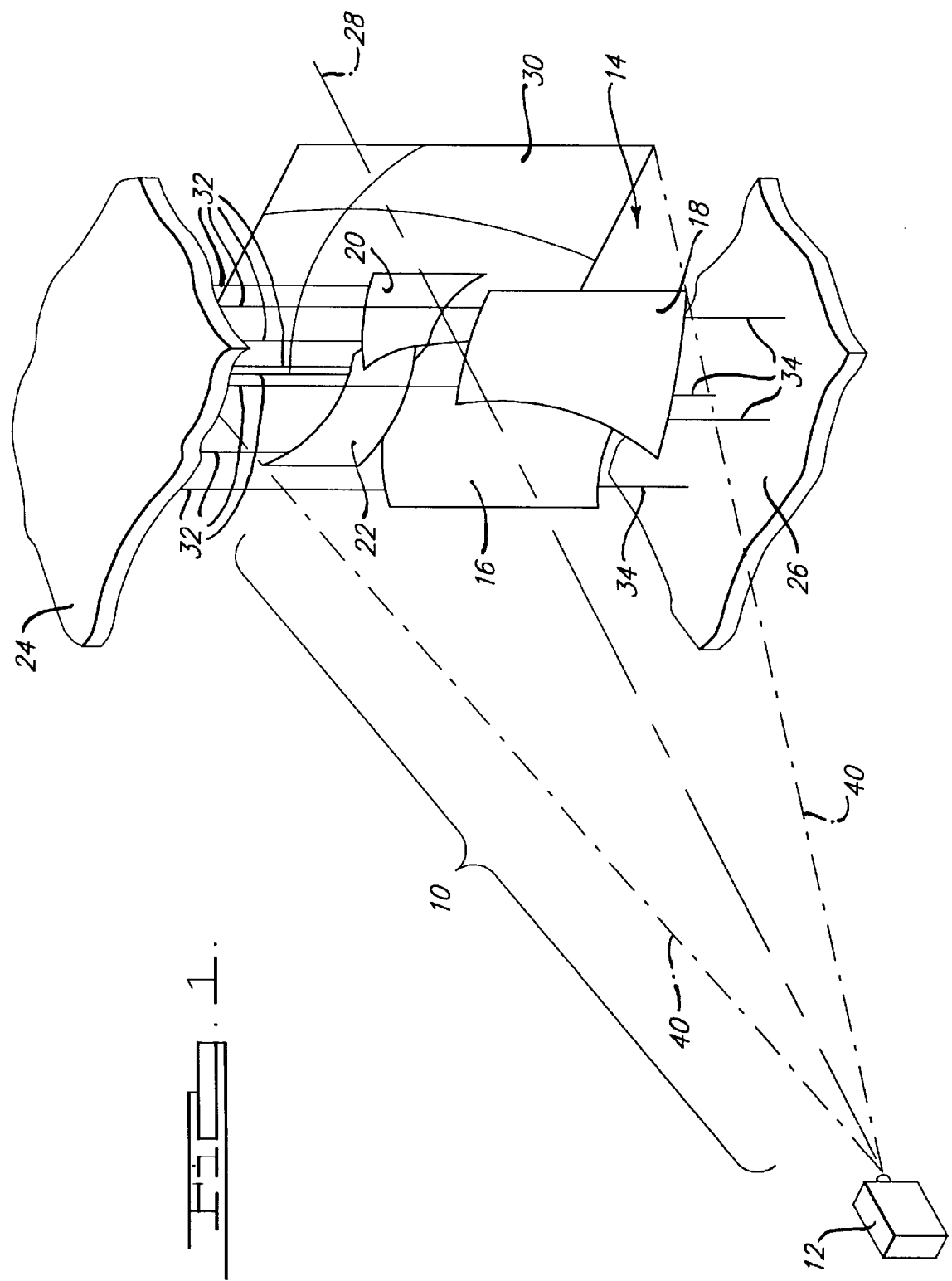

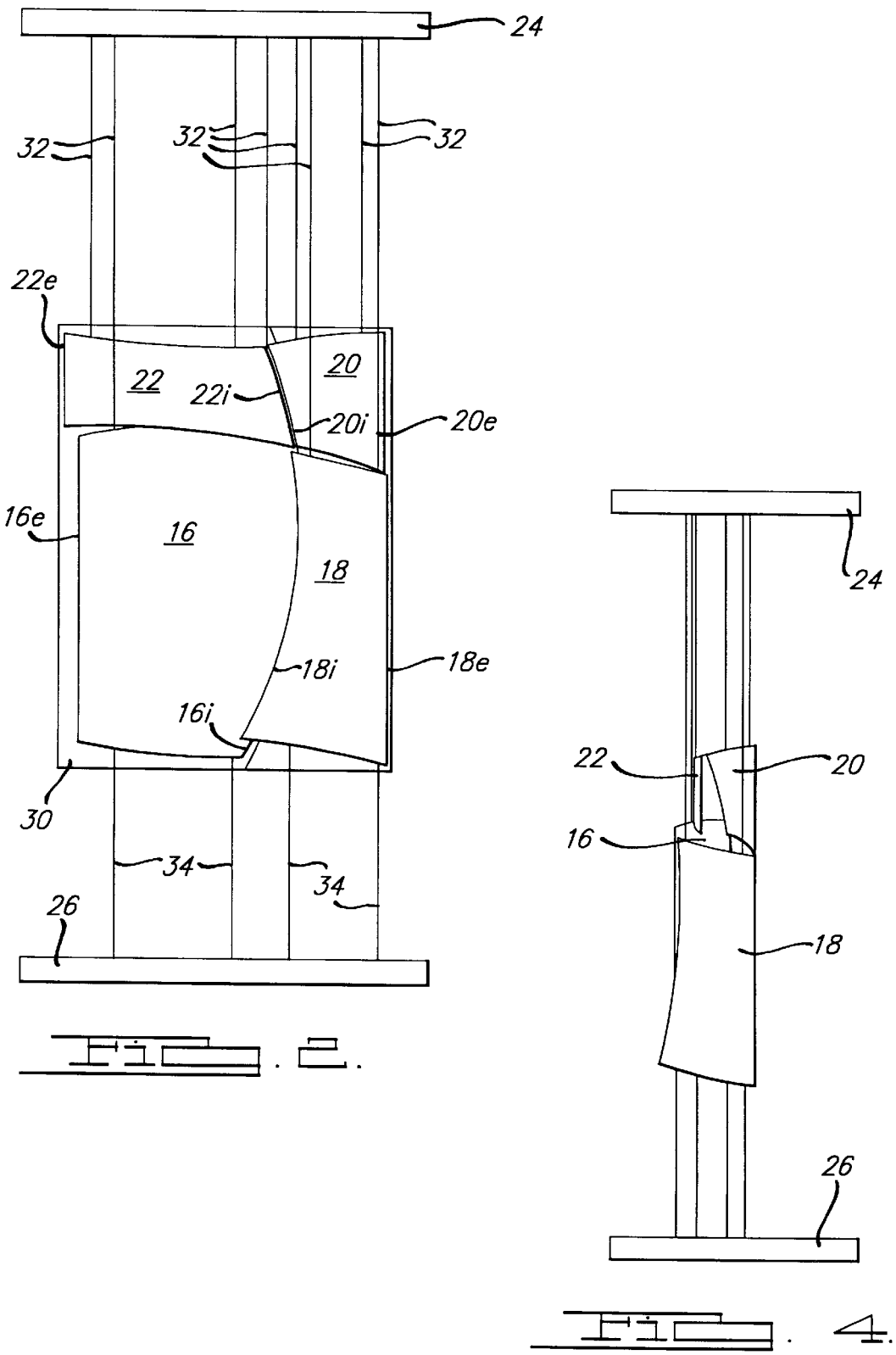

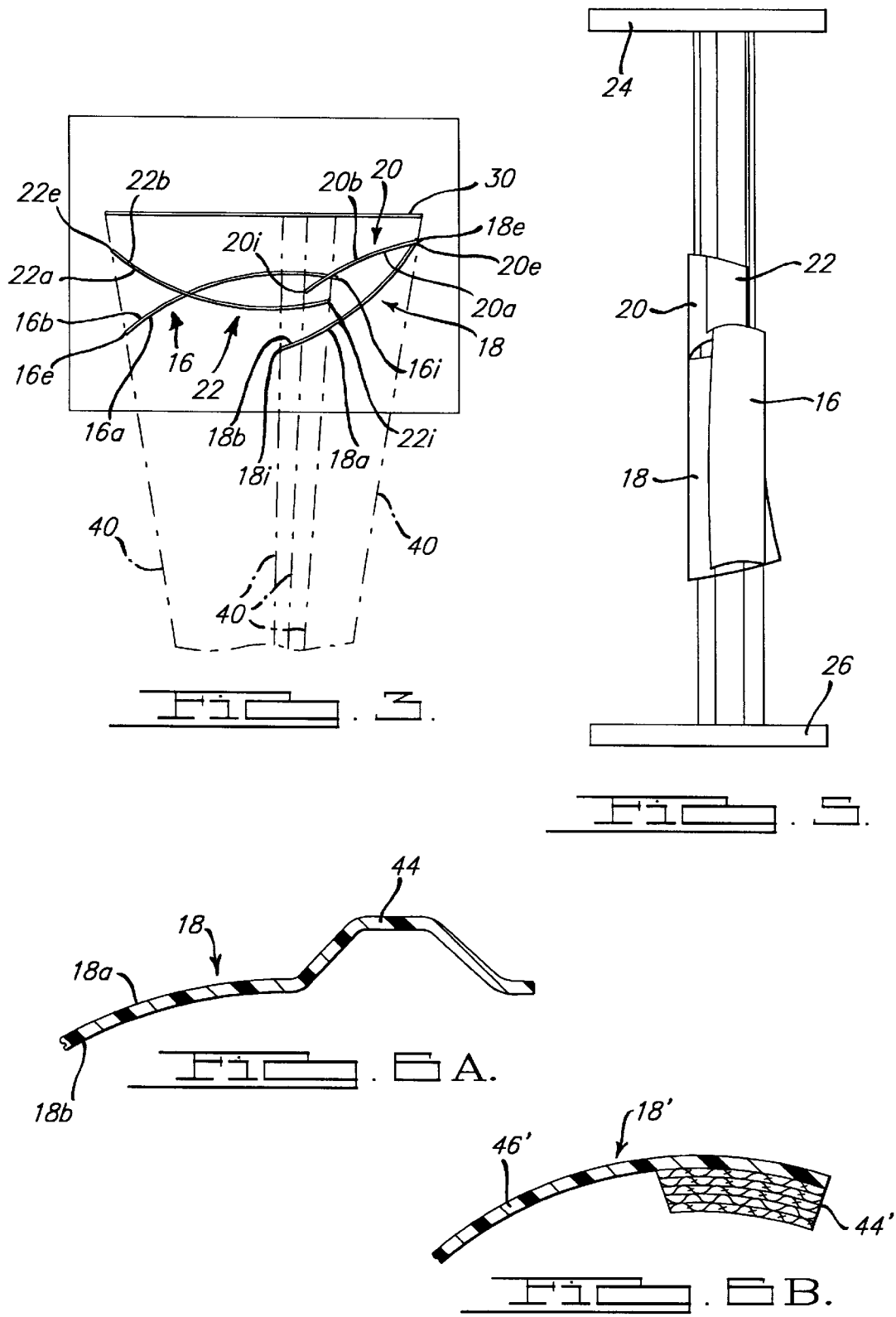

VIDEO DISPLAY SYSTEM HAVING MULTIPLE PANEL SCREEN ASSEMBLY

TECHNICAL FIELD

The present invention generally relates to a screen assembly for a video display system, and more particularly to a screen assembly having multiple irregularly curved screens which are located at varying distances along a projection axis defined by a projection source, but which, when combined, form an apparent coplanar viewing surface relative to the projection axis.

BACKGROUND OF THE INVENTION

As the information age and the technology associated therewith progress, there is an ongoing need to develop new and innovative means for displaying information and attracting attention to the displayed information. This need is most prevalent in a retail environment where purchasing decisions are, for the most part, made in the store. As such, effective advertisement is a key element to successful retailing.

In known point of purchase applications, video displays have consisted of unitary screens or television monitors upon which an image is projected. Multiple screens or monitors have been used, but typically are remotely located with respect to one another and display the same information. While these systems are relatively simple and easy to use, they have largely lost their ability to attract attention due to the consumer's intimate familiarity with these television-type displays. In an effort to capture attention, these display systems rely almost entirely on the content of the video image, rather than the display system, to achieve visual impact and effect.

Accordingly, there is a need to provide an innovative video display system which integrates new technology with the goal of creating an engaging visual experience for effective point of purchase advertising and marketing strategies. In addition, there is a need to provide a video display system which can be readily installed in a variety of indoor environments such as retail interiors or window displays, building lobbies or vestibules, convention centers, malls, churches and other public spaces, as well as in various outdoor environments such as concerts and sporting events.

SUMMARY OF THE INVENTION

It is a principal object of the present invention to provide a video display system having multiple irregularly shaped screens which are arranged in an offset manner along a projection axis, but which, when combined, form a viewing surface relative to the projected image such that the projected image is captured on the screen assembly.

It is another object of the present invention to provide a video display system in which a screen assembly forms an apparent continuous viewing surface such that the entire projected image may be captured thereon.

It is an additional object of the present invention to provide a video display system having a spatially oriented multi-screen assembly which provides an enhanced viewing experience enabling the viewer to perceive a projected image from any point of reference, thereby capturing the attention of viewers around the entire video display system as opposed to prior art screens which lose the attention of viewers when viewed from the side.

It is a further object of the present invention to provide a video display system enabling the viewer to perceive the front side of one projection screen and the backside of another projection screen simultaneously.

It is a further object of the present invention to provide a video display system having screen panels which may fabricated in a "frameless" or framed construction to optimize the viewing surface thereof.

It is yet another object of the present invention to provide a convenient means for arranging and assembling screen panels of a multi-screen assembly.

In accordance with these and other objects of the present invention, a video display system is disclosed which includes a display projector for projecting video imagery onto a screen assembly having multiple screen panels that are suspended together in space. The multiple irregularly curved screen panels are spatially oriented in an offset manner with respect to an axis emanating or coming from the projection source, i.e., the projection axis. Each screen panel is fabricated from a translucent material such that the video image may be viewed from either the front side or the rear side of the screen panel. In addition, each screen panel may be formed with a concave or convex curvature relative to the projection axis and fixed precisely in space at different depths from the projector such that the screen panels combine to create an apparent co-planar projection surface.

Animated projected imagery displayed on the screen assembly of the present invention creates a sensation that the screen panels, rather than the video, are in motion. While the screen panels combine to provide a continuous and seamless projection area, the visual experience of the imagery upon the screen gives the effect of viewing several different video images simultaneously. As the video image passes over the screens, undulating in and out of the curved surfaces, the viewer is provided with the sense that individual parts of the video display are moving at varying speeds—either speeding up or slowing down—depending on the curvature and angular orientation of the screen, as well as the relative position of the viewer to the video display assembly.

The video display assembly of the present invention creates an enticing environment that allows the viewer to consume and experience information and advertisements in a new, more engaging way. The sculptural nature of the video display assembly, the particular supporting structure, and the use of back lit imagery allows for viewing of the video display from all sides which provides the viewer with an opportunity to perceive the video imagery differently from different angles. For example, viewing the video display assembly from the back and front provides a more continuous and rhythmic flow of imagery. However, when the video display assembly is viewed from the side, it can appear as if the video images are moving in different directions, and in some cases even crossing into and blending into each other. Thus, the video display assembly attracts attention and encourages viewers to become an active, rather than a passive, component of the display system, by continuously moving about the video display assembly to experience its ever changing nature.

These and other objects, features and advantages of the present invention will become apparent from the following description when viewed in accordance with the accompanying drawings and appended claims.

BRIEF DESCRIPTION OF THE DRAWINGS

FIG. 1 is a perspective view of a suspended video display assembly of the present invention;

FIG. 2 is a front view of the video display assembly of the present invention viewed along the projection axis;

FIG. 3 is a top view of the video display assembly of the present invention;

FIG. 4 is a right side view of the video display assembly of the present invention;

FIG. 5 is a left side view of the video display assembly of the present invention;

FIG. 6a is a cross-sectional view of the edge of a screen panel showing its "frameless" construction; and FIG. 6b is a cross-sectional view of the edge of a screen panel showing a frame and film construction;

DETAILED DESCRIPTION OF THE INVENTION

Figure 7A:
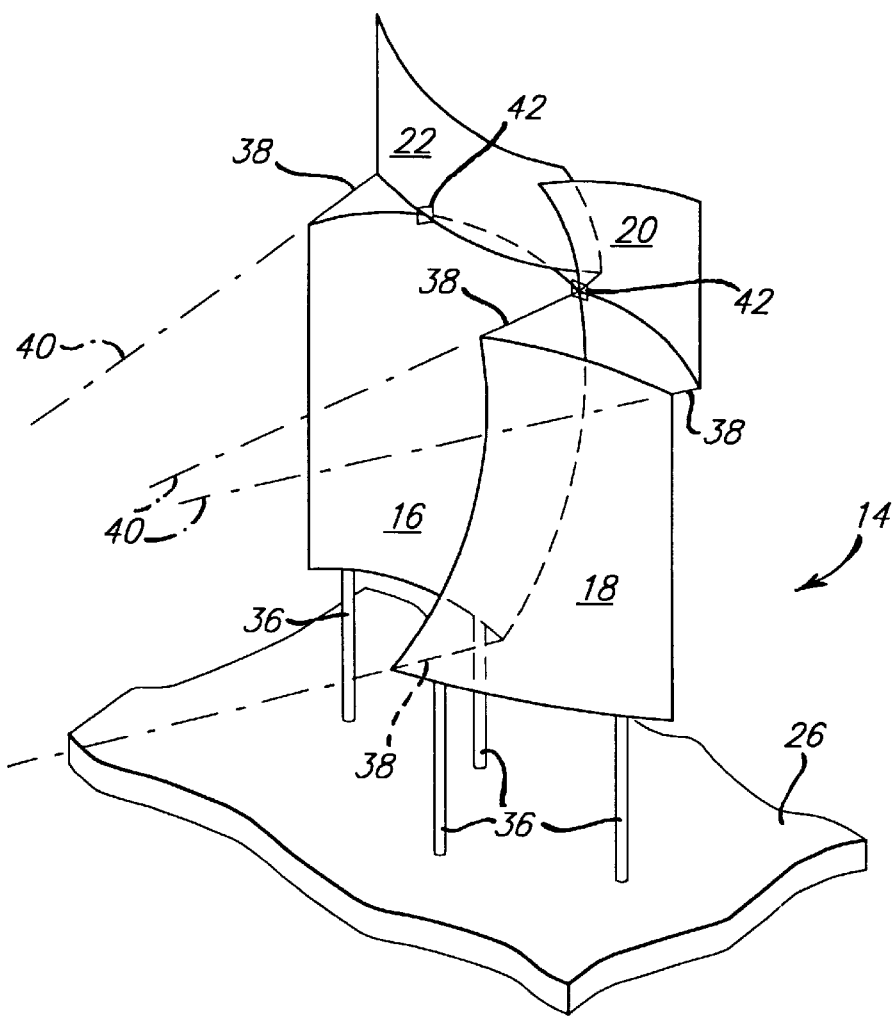
FIG. 7a is an alternate preferred embodiment of the present invention having a self-standing video display system.

With reference to FIG. 1, a video display system 10 in accordance with the present invention is illustrated having a liquid crystal display projector 12 which projects a video image upon a projection screen assembly 14 having four discrete screen panels 16, 18, 20, 22 suspended from upper support surface 24 and secured to lower support surface 26. While a single projection source is illustrated in FIG. 1, one skilled in the art will readily recognize that multiple projection sources could be used in the present invention.

With reference to FIG. 3, screen panels 16, 18, 20, 22 have curved interior edges 16i, 18i, 20i, 22i such that the interior edges of adjacent screen panels are complementary. The individual screen panels 16, 18, 20, 22 are arranged in an offset manner along a projection axis 28 defined by projection source 12. In other words, screen panels 16, 18, 20, 22 are positioned at different linear distances and angular orientations along projection axis 28 with respect to image plane 30. Furthermore, each of the screen panels 16, 18, 20, 22 may be curved in a concave or convex manner relative to projection source 12. In this manner, screen panels 16, 18, 20, 22 provide diverse picture planes within screen assembly 14. Screen panels 16, 18, 20, 22 may be combined to form an apparent continuous image plane 30 which completely captures a projected image, which avoids any overlapping of individual projection surfaces that would cause shadowing and which eliminates the occurrence of gaps between the screens that would allow light to leak into the surrounding environment. In this embodiment, screen assembly 14 creates the illusion of a singular projection surface 30 from a plurality of screen panels 16, 18, 20, 22 existing at different, intersecting planes in space which are arranged at varying angles to one another. Alternately, screen panels 16, 18, 20, 22 may be arranged in a manner that allows portions of the projected imagery to leak or splash through screen assembly 14 or that creates shadowing, thereby creating a different visual effect.

With continued reference to all of the figures, the illustrated embodiment of screen assembly 14 measures approximately four feet (4') wide by seven feet (7') high and projection source 12 is located a distance of approximately eight feet (8') from screen assembly 14. With reference to FIGS. 2 and 3, screen panel 16 comprises approximately fifty percent (50%) of the total screen area and is located in the lower left quadrant of screen assembly 14. With particular reference to FIG. 3, screen panel 16 has a concave configuration relative to projection source 12 and is angularly oriented such that an interior vertical edge 16i of screen panel 16 is located closer to projection source 12 than an exterior vertical edge 16e of screen panel 16. Screen panel 18 comprises approximately twenty-four percent (24%) of the total screen area of screen assembly 14 and is located in the lower right quadrant thereof. Screen 18 has a convex curvature with respect to projection source 12 and is angularly oriented with respect to projection axis 28 such that an interior vertical edge 18i of screen panel 18 is positioned closer to projection source 12 than an exterior vertical edge 18e of screen panel 18. Screen panel 20 comprises approximately eight percent (8%) of the total screen area and is located in the upper right quadrant of screen assembly 14. Screen panel 20 has a concave configuration with respect to projection source 12 and is angularly oriented such that an interior vertical edge 20i of screen panel 20 is positioned closer to projection source 12 than an exterior vertical edge 20e of screen panel 20. Screen panel 22 comprises approximately eighteen percent (18%) of the total screen area and is located in the upper left quadrant of screen assembly 14. Screen panel 22 has a convex configuration with respect to projection source 12 and is angularly oriented with respect to projection axis 28 such that an exterior vertical edge 22e is positioned closer to projection screen 16 than an interior vertical edge 22i of screen panel 22.

In the illustrated embodiment, screen assembly 14 includes a first pair of screen panels 16, 22 and a second pair of screen panels 18, 20, each pair having a concave screen panel and a convex screen panel which provides a unique visual effect when combined with animated video imagery as hereinafter described. The geometric configuration of screen assembly 14 permits the front surface 22a of screen panel 22 and the back surface 16b of screen panel 16 to be viewed simultaneously from a fixed point of reference such as a perspective view from the left of projection source 12 as illustrated in FIG. 1. While the present invention has been illustrated to show the curvature of all four screen panels 16, 18, 20, 22 about various vertical axes, one skilled in the art would readily recognize that one or more of the screen panels could be flat or could be curved about various horizontal axes, or alternately curved about any combination of axes. Likewise, the size, shape and arrangement of the various screen panels may be modified to accommodate a wide range of needs and space.

Furthermore, the particular format, aspect ratio and arrangement of the screen assembly is not limited to the configuration illustrated in the drawings, but can be readily adapted to accommodate the other configurations, including but not limited to landscape configurations, square, circular, eliptical or irregularly-shaped circumferential configurations, overlapping or gapping arrangements, etc. as dictated by a specific application.

With reference again to FIG. 1, each of the screen panels 16, 18, 20, 22 are suspended between upper support surface 24 and lower support surface 26 in a manner to precisely fix the screen panels relative to one another. Upper support surface 24 and lower support surface 26 may be the ceiling and floor, respectively or may be a planar member attached to the ceiling and floor. Likewise, a grid or frame-type structure having predefined attachment locations could be utilized for upper and is lower support surfaces 24, 26, thereby further facilitating on-location installation and alignment of screen assembly 14. Each screen panel has a pair of suspension wires 32 extending from an upper edge thereof to upper support surface 24. Suspension wires 32 may be of a light gauge wire or monofilament line to minimize the visual intrusion thereof and may be attached to upper support surface 24 by an eye screw (not shown) or other suitable means of attachment. Similarly, the lower ends of suspension wire 32 are secured to each individual side panel by providing an aperture (not shown) through an edge portion thereof and tying or otherwise securing the suspension wire to the screen panel. A pair of tie down wires 34 extend from the lower portion of each of the lower screen panels 16, 18 and are secured to lower support surface 26. Tie down wires 34 are secured to lower support surface 26 and screen panels 16, 18 in a manner similar to suspension wires 32.

Figure 7B:
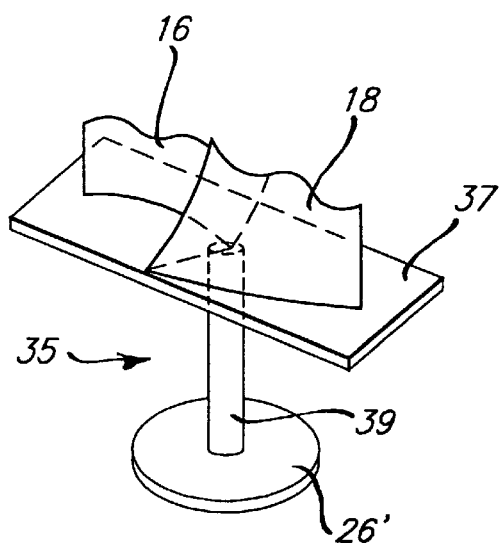
FIG. 7b is a modification to the self-standing video display system of the alternate preferred embodiment.

With reference now to FIG. 7*a,* an alternate preferred embodiment of the present invention is illustrated in which screen assembly 14 is provided in a self-supporting configuration in which each of the screen panels are interconnected and precisely fixed in space. More specifically, a pair of poles 36 extend downwardly from the lower edge of each of lower screen panels 16, 18 and may be secured to a lower support surface 26 such as a base plate. Alternately, as shown in FIG. 7*b,* a pedestal base assembly 35 may be used. More specifically, upper base 37 supports the lower exterior horizontal edge of screen panels 16, 18, and a pedestal 39 extends downwardly from upper base 37 to lower base 26'. Spacer elements 38 extend between adjacent screen panels to integrally connect them in the appropriate spaced relationship. As presently preferred, spacer elements 38 may be axially aligned along an image path 40 of projection source 12 to minimize the visual intrusion thereof. Furthermore, molded screen panel clips 42 may be used to interconnect edge portions of the screen panels which engage one another. In this manner, screen assembly 14 is self-supporting and may be readily assembled in the proper geometric configuration.

Thus, the supporting structure of screen assembly 14 may be constructed to integrate with a specific application. For example, an unobstructive structure will yield a visual impression that each screen or panel is floating in space whereas a relatively large supporting structure may convey a more industrial appearance.

Each screen panel 16, 18, 20, 22 is fabricated from a translucent material which permits a portion of the projected image to be viewed from a front surface 16*a,* 18*a,* 20*a,* 22*a* of each screen panel of screen assembly 14. The remainder of the projected image is transmitted through screen panel 16, 18, 20, 22 such that a transmitted image may be visible from the back surface 16*b,* 18*b,* 20*b,* 22*b* of each screen panel in screen assembly 14. For example, each screen panel may be formed from a high impact styrene which is vacuum formed in the desired irregular shape with the desired curvature. Each screen panel may be formed to include a bead portion 44 formed along the edge of the panel to further enhance the rigidity thereof as best seen in FIG. 6*a.* Alternately, each screen panel may be formed with a separate frame portion 44' of a suitable plywood or plastic construction and having a flexible, coated sheet or film 46', such as mylar, secured to frame 44' in a suitable manner, such as with an adhesive, as illustrated in FIG. 6*b.*

To further enhance the viewing experience of the present invention, the video image projected thereon may include specific content to amplify the effect of imagery projected thereupon. For example, using screen assembly 14 illustrated herein, an animated video image, such as an image which in any combination scrolls, pulsates, intermittently stops, wipes, fades, bursts, dissolves or otherwise moves relative to screen assembly 14, may be used. In this manner, screens 16, 18, 20, 22 enhance the dynamic aspect of the projected imagery—undulating in and out of the curved surfaces thereof—such that a viewer is provided with the sense that portions of the projected image within the whole projected image are moving at various speeds—either speeding up or slowing down—depending on the configuration and orientation of the screen, as well as the relative position of the viewer to the display.

Video display system 10 thus creates the sensation that screen assembly 14, and more particularly screen panels 16, 18, 20, 22 are in motion. The viewing experience of the projected image upon screen assembly 14 gives the effect of viewing several different projected images simultaneously even though screen assembly 14 is a diverse yet integrated set of screen panels. Moreover, the translucency of the material used for screen panels 16, 18, 20, 22 captures the projected image such that it may be viewed differently from various points of reference. Further, the definition and diffusion of the imagery can be controlled with the particular type of projected image used, as well as by the type of projector used and the particular lighting conditions surrounding video display system 10.

The present invention is a sculptural video display system which appears to be suspended in space and back lit with video imagery. The present invention enhances the viewing experience by providing the viewer with the opportunity to perceive the video imagery differently from all sides and at different angles. Viewing the video display system from the front or back provides a more continuous and rhythmic flow of imagery, while viewing the video display system from the sides provides an appearance that the video images are moving in different directions, and in some cases even crossing into and blending with one another.

From the foregoing detailed description, one skilled in the art will readily recognize that the present invention provides a video display system for projecting video from one or more sources onto to a non-uniform surface comprised of two or more curved screens that are arranged at varying angles relative to one another and that exists at different/intersecting planes in space relative to the projection axis of the sources. While the present invention has been disclosed by describing and illustrating various exemplary embodiments, those skilled in the art will readily recognize from the foregoing discussion and accompanying drawings and claims, that changes, modifications and variations can be made therein without departing from the spirit and scope of the invention as defined in the following claims.

What is claimed is:

1. A screen assembly for a video display system comprising:

a first screen panel fixedly positioned for displaying a first image portion projected from an image source onto a front surface of said first screen panel, said first screen panel fabricated from a translucent material such that said first image portion is viewable from a back surface thereof; and a second screen panel fixedly positioned for displaying a second image portion which is discrete from said first image portion, said second screen panel having a front surface generally facing toward said image source;

said second screen panel being offset and fixedly positioned from said first screen panel such that a portion of said front surface of said second screen panel and a portion of said back surface of said first screen panel are simultaneously viewable from a first point of reference.

2. The screen assembly of claim 1 wherein first screen panel has a first edge formed thereon and said second screen panel has a second edge formed thereon which is complementary and positioned adjacent to said first edge.

3. The screen assembly of claim 1 wherein said first edge and said second edge are curvilinear.

4. The screen assembly of claim 1 wherein said second screen panel is angularly offset from said first screen panel.

5. The screen assembly of claim 4 wherein said second screen panel is linearly offset said first screen panel.

6. The screen assembly of claim 1 wherein said second screen panel is linearly offset said first screen panel.

7. The screen assembly of claim 1 wherein said first screen panel is a concave screen panel and said second screen panel is a convex screen panel.

8. The screen assembly of claim 1 wherein said second screen panel is fabricated from a translucent material such that said second image portion is viewable from a front surface and a back surface of said second screen panel.

9. The screen assembly of claim 8 wherein said front surface of said first screen panel and said back surface of said second screen panel are simultaneously viewable from a second point of reference.

10. The screen assembly of claim 1 wherein said first and second screen panels are suspended between an upper support surface and a lower support surface.

11. The screen assembly of claim 10 further comprising a first suspension element extending between an upper edge of said first screen panel and said upper support surface and a second suspension element extending between an upper edge of said second screen panel and said upper support surface.

12. The screen assembly of claim 11 further comprising a tie down element extending between a lower edge of at least one of said first and second screen panels and said lower support surface.

13. The screen assembly of claim 1 wherein each of said first and second screen panels comprises a screen frame and a flexible sheet secured to said frame.

14. A screen assembly for a video display system comprising:
   a first curvilinear screen panel displaying a first image portion; and
   a second curvilinear screen panel displaying a second image portion which is discrete from said first image portion, said first screen panel and said second screen panel fixedly positioned to form an apparent continuous image plane for displaying a projected image defined by said first image portion and said second image portion.

15. The screen assembly of claim 14 wherein at least one of said first curvilinear screen panel and said second curvilinear screen panel has a concave curvature.

16. The screen assembly of claim 14 wherein at least one of said first curvilinear screen panel and said second curvilinear screen panel has a convex curvature.

17. The screen assembly of claim 14 wherein said first screen panel has a first edge and said second screen panel has a second edge which is complementary and positioned adjacent to said first edge.

18. The screen assembly of claim 17 wherein said first edge and said second edge are curved.

19. The screen assembly of claim 14 wherein said first and second screen panels are fabricated from a translucent material such that the projected image may be viewed from a front surface and a back surface of each of said first and second screen panels.

20. The screen assembly of claim 19 wherein said front surface of said first screen panel and said back surface of said second screen panel are simultaneously viewable from a fixed point of reference.

21. The screen assembly of claim 19 wherein said front surface of said second screen panel and said back surface of said first screen panel are simultaneously viewable from a fixed point of reference.

22. A video display system comprising a screen assembly having a plurality of screen panels displaying an image, said screen assembly including:
   a first screen panel having a first interior edge and a second interior edge;
   a second screen panel having a third interior edge which is complementary to said first interior edge and positioned adjacent thereto, and a fourth interior edge, said second screen panel being offset from said first screen panel;
   a third screen panel having a fifth interior edge which is complementary to said second interior edge and positioned adjacent thereto, and a sixth interior edge, said third screen panel being offset from said first screen panel;
   a fourth screen panel having a seventh interior edge which is complementary to said sixth interior edge and positioned adjacent thereto, and an eighth interior edge which is complementary to said fourth interior edge and positioned adjacent thereto, said fourth screen panel being offset from said first screen panel;
   wherein said first screen panel, said second screen panel, said third screen panel and said fourth screen panel define a discontinuous viewing surface which displays said image as an apparent coherent image relative to a projection axis; and
   wherein at least one of said first screen panel, said second screen panel, said third screen panel and said fourth screen panel has a concave curvature with respect to an image source, and wherein at least one of said first screen panel, said second screen panel, said third screen panel and said fourth screen panel has a convex curvature with respect to an image source.

23. The video display system of claim 22 wherein said first screen panel has a concave curvature, said second screen panel has a convex curvature, said third screen panel has a concave curvature and said fourth screen panel has a convex curvature.

24. The video display system of claim 22 wherein said screen assembly has a total screen area and wherein one of said first screen panel, said second screen panel, said third screen panel and said fourth screen panel has a screen panel area comprising approximately fifty percent (50%) of said total screen area.

25. The video display system of claim 22 wherein said first screen panel is positioned in an upper left quadrant of said screen assembly, said second screen panel is positioned in a lower left quadrant of said screen assembly, said third screen panel is positioned in an upper right quadrant of said screen assembly, said fourth screen panel is positioned in a lower right quadrant of said screen assembly.

26. The video display system of claim 22 further comprises a projection source for projecting said image along a projection axis.

27. The video display system of claim 22 wherein said first, second, third and fourth screen panels are fabricated from a translucent material such that said image projected thereupon may be viewed from a front surface and a back surface of each of said screen panels.

28. The video display system of claim 27 wherein said front surface of one of said screen panels and said back surface of another of said screen panels are simultaneously viewable from a fixed point of reference.

29. A video display system comprising:

an image source projection an image; and a translucent screen assembly having a plurality of screen panels displaying said image which is viewable from a front surface facing generally toward said image source and a back surface opposite said front surface, said screen assembly including:

a first curvilinear screen panel fixedly positioned in an upper left quadrant of said screen assembly, said first screen panel having a first interior edge and a second interior edge;

a second curvilinear screen panel fixedly positioned in a lower left quadrant of said screen assembly and offset from said first screen panel, said second screen panel having a third interior edge which is complementary to said first interior edge and positioned adjacent thereto and a fourth interior edge;

a third curvilinear screen panel fixedly positioned in an upper right quadrant of said screen assembly and offset from said first screen panel, said third screen panel having a fifth interior edge which is complementary to said second interior edge and positioned adjacent thereto, and a sixth interior edge; and a fourth curvilinear screen panel fixedly positioned in an lower right quadrant of said screen assembly and offset from said first screen panel, said fourth screen panel having a seventh interior edge which is complementary to said sixth interior edge and positioned adjacent thereto and an eighth interior edge which is complementary to said fourth interior edge and positioned adjacent thereto; and wherein said first screen panel, said second screen panel, said third screen panel and said fourth screen panel define a discontinuous viewing surface which displays said image as an apparent coherent image relative to said image source.

* * * * *